United States Patent [19]

Liang

[11] Patent Number: 5,933,427
[45] Date of Patent: Aug. 3, 1999

[54] SWITCH SYSTEM EMPLOYING A N:M SWITCH CIRCUIT FOR ROUTING PACKETS AMONG DEVICES IN A DATA COMMUNICATION NETWORK

[75] Inventor: Chao-Yu Liang, Cupertino, Calif.

[73] Assignee: EdgePoint Networks, Inc., Santa Clara, Calif.

[21] Appl. No.: 08/812,379

[22] Filed: Mar. 5, 1997

Related U.S. Application Data

[63] Continuation-in-part of application No. 08/791,868, Jan. 31, 1997, Pat. No. 5,889,776.

[51] Int. Cl.[6] .............................. H04L 12/50; H04Q 11/00
[52] U.S. Cl. .......................... 370/359; 370/392; 370/419; 370/415; 370/446; 395/311
[58] Field of Search ...................................... 370/389, 462, 370/392, 468, 401, 477, 412, 422, 445, 407, 408, 446, 455, 447, 353–359, 360, 362, 428, 419, 420, 415; 340/825.79, 825, 825.8; 395/311

[56] References Cited

U.S. PATENT DOCUMENTS

| | | | |
|---|---|---|---|
| 5,319,644 | 6/1994 | Chao-Yuliang | 370/419 |
| 5,440,547 | 8/1995 | Easki et al. | |
| 5,568,300 | 10/1996 | Ishibashi | |
| 5,757,795 | 5/1998 | Schnell | 370/392 |
| 5,790,546 | 8/1998 | Dobbins et al. | 370/400 |

*Primary Examiner*—Douglas W. Olms
*Assistant Examiner*—Seema S. Rao
*Attorney, Agent, or Firm*—Joe Zheng; Chi-Ping Chang; Pacific Law Group, LLP

[57] ABSTRACT

It is disclosed hereby that a switch system comprises a N:M switch circuit, a plurality of layer 2 switches, each comprising a plurality of packet processing channels, and a plurality of network interfaces, each comprising a fixed number of pairs of ports to be directly connected to the same number of devices. The N:M switch is coupled with the N number of the packet processing channels of the layer 2 switches at the N-side and with the M number of the ports of the network interfaces at the M-side. When a packet containing a destination to a receiving device sent by a sending device arrives at the network interface, the N:M switch establishes an electronic connection between an available packet processing channel and a port to which the sending device is connected, the packet passes through to the packet processing channel in which the packet is processed and stored. The N:M switch establishes another connection between the packet processing channel and a new port of the network interface to which the receiving device is connected to, thereby the stored packet passes through to the receiving device to finish a transmission of the packet between the sending device and the receiving device.

13 Claims, 5 Drawing Sheets

SWITCH SYSTEM EMPLOYING A N:M SWITCH CIRCUIT FOR ROUTING PACKETS AMONG DEVICES IN A DATA COMMUNICATION NETWORK

CROSS-REFERENCE

This application is a continuation-in-part of co-pending application Ser. No. 08/791,868 by the same applicant filed on Jan. 31, 1997, entitled "A Physical Layer Switch System for Ethernet Local Area Network Communication System," now U.S. Pat. No. 5,889,776.

FIELD OF INVENTION

The present invention relates to the area of Ethernet local area network, and more particularly relates to a scalable switch system that employs a N:M switch circuit for establishing electronic connections between a plurality of switch fabrics and connectivity modules for packets to pass through to packet processing channels, respectively, in the switch fabrics and re-establishing new connections for the packets to go through from the corresponding packet processing channels to the destinations accordingly so that a packet in a packet processing channel does not have to be transferred to another packet processing channel in order to reach its destination.

DESCRIPTION OF THE RELATED ART

Local Area Network (LAN) is generally used for data communication in enclosed areas such as one wing of one floor in a building or several buildings on a campus. Because of the locality nature of the LAN, there are various network architectures that guide data to move across wires, cables or other media. Of all the architectures, Ethernet and token ring are the most commonly used network architectures. One of the basic differences between the two architectures is the transmission speed versus data collision. With Ethernet, any device in the network, for example, from central computers in headquarters to local computers on office desktops, can exchange data in a packet frame to any other devices in the network at any time. Because there are a plurality of the machines/devices on the network and very likely some of them send data at the same time, thereby the simultaneous data transmission in the same network may result in what is called data collision. To avoid such collision, the Ethernet LAN based on Carrier Sense Multiple Access/Collision Detection (CSMA/CD) technique is able to make the machines/devices stop transmitting data if the network is busy and wait for a while and try to transmit the same data again. While in a token ring LAN, as the name suggests, there is no data collision, a machine to send data must wait for a token to invoke a data transmission, often resulting in lower data transmission efficiency. The Ethernet LAN is therefore more adopted in network applications in which there are one or a few central computers or servers communicating with a plurality of devices or clients or a plurality of devices in communication with each other.

To further enhance the data transmission performance in the LAN, especially in which there are a plurality of devices in communication with each other, a switch arrangement system is often employed to manage the transmission of packets in order to increase data transmission throughput. There have been many efforts in developing such a switch system that is able to reroute the arriving packets to any available ports to their respective destinations without any time delay. It is known to the art that one of the switch systems is a Time-Space-Time switch that uses a controller to schedule the arrivals of the packets. Each arriving packet to the switch preceded by a time slot interchange is rearranged in the time sequence so that arriving packets are destined for distinct separate outputs. However, the real implementation of such a switch system turns out that to schedule the packet arrivals is a difficult task and requires too much time to determine permissible input to output combinations.

Most of the switch systems in the Ethernet LAN today are Layer 2 switch or Layer 3 switch. The switch systems comprise a switch fabric that has an equal number of packet processing channels as the number of devices connected to the switch system, referred to as N:N switch system. Each of the packet processing channels further comprises a plurality of electronic components, media access controller (MAC), first-in-first-out (FIFO) logic circuit and memory or buffers. Therefore, the N:N switch means that there are N packet processing channels, each designated to one of the N devices directly or indirectly in connection to the switch system in the LAN, for example, one switch fabric has 8 packet processing channels or ports, and so exactly eight devices can be connected thereto. Some of the ports in the switch fabric often become idle when there are no data transmissions through the ports. Moreover these idle ports can not be used as alternative routing paths for other arriving packets accumulated at a busy port. A busy port however can only transmit one packet each time. If the continuously arriving packets destining for the busy port are not timely rerouted, the busy port would suffer what is called back pressures from the arriving packets, resulting in signal jams that induce an even busier traffic or network throughput degradation in the network. Such switch architecture is obviously not efficient and cost effective especially in desktop network environment in which each desktop device does not have data to transmit in the network all the time. That means that the network traffic does not present a constant data flow in the network traffic. Instead the network traffic pattern has been observed to be a burst pattern, meaning a number of devices tend to talk to a central machine or another device only for a short period of time and then the network becomes idle for the rest of the time. This proves that the current switch fabric architecture is not being used to its capacity as the ports in the switch fabric are dedicated permanently to each path.

There is, therefore, a great need for an intelligent network switch system in which a switch circuit can establish a linkage between a device and a packet processing channel in the switch system upon receiving an arriving packet from the device and disengage the linkage upon the completion of the packet transmission and establish another linkage between another device and the packet processing channel if a newly arrived packet is from the device. The combined use of the ports and packet processing is channels can ease dramatically the traffic and increase the efficiency of the switch system in the network.

In many smaller Ethernet LANs, there are a large number of devices but only one or few central machines/servers. These devices have the same privilege to talk to the central machines but work independently most of the time and only occasionally communicate to one of the central machines for a short period of time. To install a switch system with a N:N switch therein in the network is a low-efficient approach. Moreover, the cost of the switch system increases as the number of the device increases. Thus there has been another need for a network switch system that is of different scalability and modularity. This means that a switch system can be reconfigured with ease to meet the need of the increased number of the local devices without increasing the cost of the switch systems. In other word, the cost of the switch system is primarily controlled by the network traffic rather than the number of the local devices.

With the architecture of one packet processing channel per device, a packet is often transferred from one packet processing channel directly or indirectly connecting to a sending device to another packet processing channel and sometimes worse in another switch fabric in order to reach its receiving device. There can be significantly time delays, especially when the packet processing channel communicating with the receiving device is busy and moreover the architecture requires a complicated data bus layout among the switch fabrics if there are more than one switch fabrics in the switch system. Thus there still has been another need for a switch system that provides a switch mechanism to directly guide the packet to its destination without transferring the packet to another packet processing channel. The elimination of the packet transferring process makes the packet delivery independent from packet processing channels and increases dramatically the signal throughput rate, hence the overall performance of the switch system.

SUMMARY OF THE INVENTION

The present invention has been made in consideration of the above described problems. The present invention provides a generic switch system to a data communication network that comprises at least two devices, either one can receive data from another or send data to another in a packet frame. The packet frame further comprises DA and SA information, the former one indicates where the data is intended to and the latter one indicates where the data is sent.

The disclosed switch system comprises at least one switch fabric having a plurality of packet processing channels, each comprising one buffer and one MAC, a N:M switch circuit having a plurality of N-side ports and at least two M-side ports and a network interface having at least two device channels. In the switch circuit, each of the N-side ports is connected to the packet processing channels and each of the M-side ports is connected to the device channels of the network interface, respectively, meanwhile each of the N-side ports is assigned to a first address and each of the M-side ports is assigned to a second address.

The device channel of the network interface comprises a pair of ports, one being a first port and the other being a second port. The first port is in communication with one of the M-side ports of the switch circuit, thereby each of the first ports or device channels has an identification in common with respect to one of the second addresses of the switch circuit. The second port in communication with the first port in the device channel of the network interface is coupled to one of the devices in the network, thereby a complete path, or a device channel, identified by a port ID for a device in a data network to the packet processing channel is configured.

The switch circuit, upon receiving the first and the second addresses, establishes corresponding detachable electronic links, respectively, between some of the N-side ports and the same number of the M-side ports, each port being addressed by the received first and second addresses, respectively, so that packets pass through the switch circuit to continue their transmission.

When a packet is coming from the network interface, the port ID indicating where the packet is from is retrieved and the switch circuit establishes an electronic link to allow the packet to pass through if there is a packet processing channel available to take a new packet. Upon receiving the packet, the MAC in the packet processing channel retrieves the port ID of the destination as the receiving port ID to which a receiving device is supposed to be connected and the data in the packet is then temporarily stored in the buffer of the packet processing channel. When it becomes known to the switch circuit that the port specified by the receiving port ID is ready, a new link between the packet processing channel and the port specified by the receiving port ID is established so that the data in the buffer passes through to the switch circuit and eventually to the destination, the port to which the receiving device is connected.

In the case that the receiving device is not present, possibly due to power off or changed port connections, the switch circuit is equipped with a special port, often referred to as embedded broadcast port or EB port, that is designed to communicate to all the device channels of the network interface, thereby all the devices that are connected to the network interface can receive the packet, hence no data would be dropped off or lost in packet transmission. As the name suggests, the EB port is often used for network broadcasting. One of the devices in the network is to send data to every single device, the regular ports of the switch circuit would not be able to fulfill the task without significantly increasing the number of the packet processing channels. However, the EB port is capable of delivering the packet to every device in the network while maintaining the original configurations and numbers of the packet processing channels in the switch fabrics.

Accordingly, an important object of the present invention is to provide a scalable switch mechanism to effectively route packet signals among devices in a data communication network;

Another object of the invention is to provide a scalable switch system that is able to handle the burst traffic pattern for effective linkages among devices in a desktop network environment;

Still another object of the invention is to provide a scalable switch system that is capable of performing cost-effective solutions to increased number of devices in a network without increasing the cost of the fabric switches;

Still another object of the invention is to provide a modularity switch architecture that is reconfigurable depending upon the traffic pattern and the number of the devices in the network as well as the network cost;

Other objects, together with the forgoing are attained in the exercise of the invention in the following description and resulting in the embodiments illustrated in the accompanying drawings.

PREFERRED EMBODIMENT—DESCRIPTION

Figure 1:
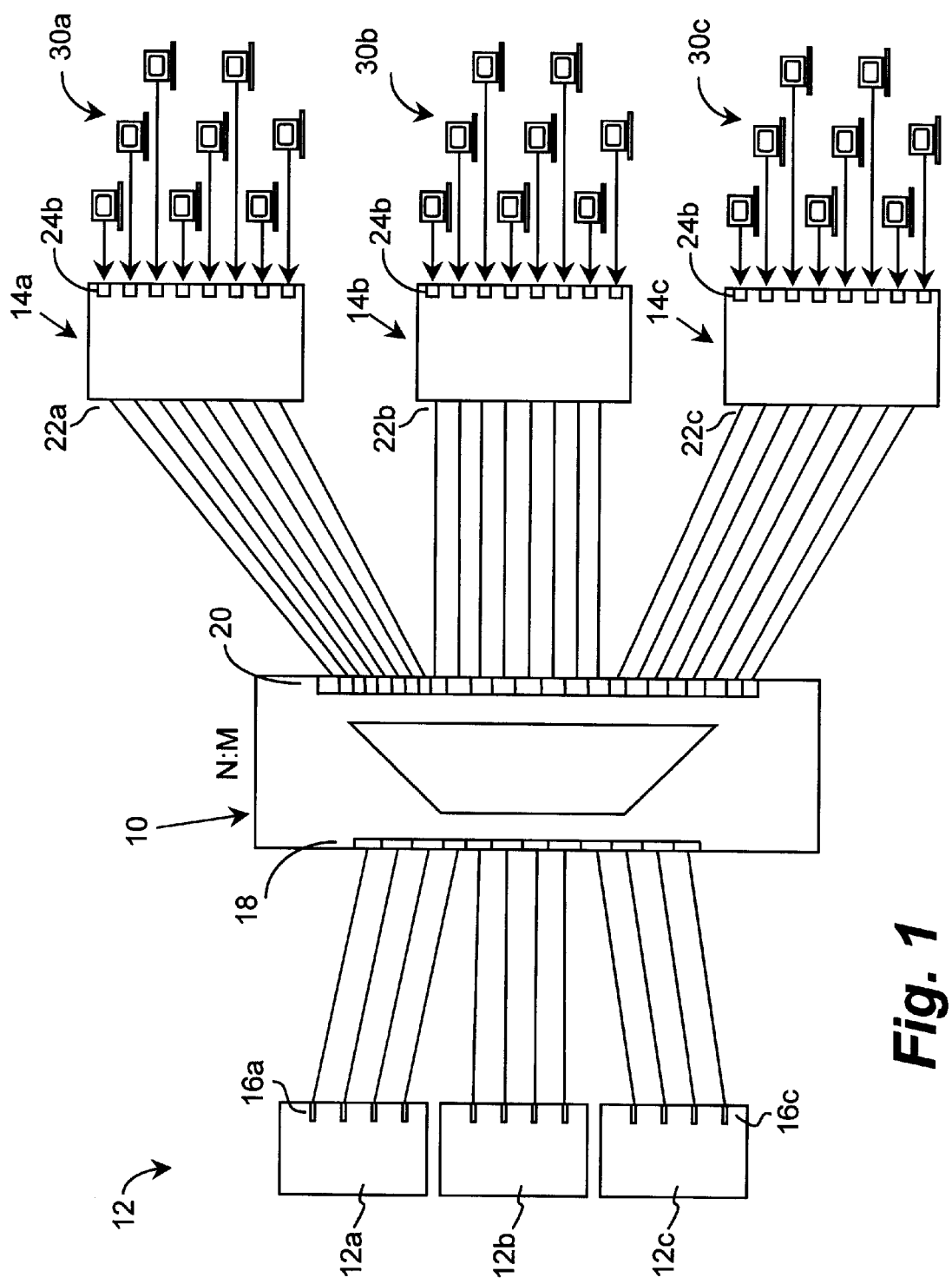
FIG. 1 shows an embodiment of the switch system disclosed herein.

Referring now to the drawings, in which like numerals refer to like parts throughout the several views, FIG. 1 shows one embodiment of the disclosed switch system comprising three switch fabrics 12a, 12b and 12c, a N:M switch circuit 10 and three connectivity modules 14a, 14b, and 14c. Each of the switch fabrics has a number of ports indicated by 16a, 16b and 16c to communicate with the N:M switch circuit 10 and there are 4 such ports in each of the switch fabrics 12a, 12b and 12c in the figure hence 12 ports in total. As shown in FIG. 1, the switch circuit 10 comprises 12 ports indicated by 18 on the N-side and 24 ports indicated by 20 on the M-side. At any time, the switch circuit 10 may establish detachable electronic connections up to the smaller number of the numbers of ports on the M-side and the N-side and 12 connections in the embodiment shown in the figure. The detachable electronic connections means herein that the connection is electronically made for a certain time and can be electronically disconnected when needed. Each of the connectivity modules, sometimes referred to as network interface herein, is connected to the N-side ports of the switch circuit 10. In the figure, each connectivity module has 8 pairs of ports, one side 22a, 22b and 22c being connected to the M-side of the switch circuit 10 and the other side 24a, 24b and 24c being connected to the devices 30a, 30b and 30c, each having the same privilege to send and receive data or packet to and from others. As shown in the figure, the switch circuit 10 comprises 24 ports on the M-side, coinciding the total number of the ports of the three connectivity modules 14a, 14b and 14c, each of the 24 ports on the M-side of the switch circuit 10 communicating directly with each of the ports of the connectivity modules 14a, 14b and 14c, respectively. Therefore each of the devices 30a, 30b and 30c has a predefined channel comprising one pair of ports of the connectivity module and one port on the M-side of the switch circuit 10. In other words, each of the channels or the device channels can be uniquely assigned to a path with an identification, referred to as port ID herein. It is understood to those skilled in the art that the port ID's can be remembered as an array of entries in a look-up-table or stored in a central processor generally with a axially memory, the central processor and the memory are known to those skilled in the art and not shown in the Figure. In fact the central processor controls all operations of the switch systems.

As is described in the co-pending application, a packet sent from a device always carries a DA and SA information. The DA information is the port identification indicating where a receiving device is connected and the SA information is an identification of the device that sends out the packet, the identification often being a sequence of 48 bits sometimes called device MAC address. The device MAC address is associated with the port ID to which the device is connected, it is a one-to-one mapping so that a packet can be delivered unmistakably to the destination.

In addition it should be understood that the ports of the N:M switch circuit is expandable to accommodate the total number of packet processing channels and all the device channels, respectively. Moreover such expansion can be implemented by extending the number of the diodes in an exemplary embodiment in the co-pending application when there is a necessity of increasing the number of network interfaces so as to accommodate more devices in the network or increasing the number of switch fabrics so as to accommodate higher network traffics. In reality and the art of the disclosed invention, it is generally acknowledged that higher number of the packet processing channels, the higher cost the switch system is. However the network throughput rate and efficient are not necessarily higher due to the burst traffic pattern in a data network. Therefore, the number N tends to be smaller than, preferably one half or a quarter of the number M in the N:M switch circuit, often sufficient to handle the burst traffic patterns in a data network.

Figure 2:
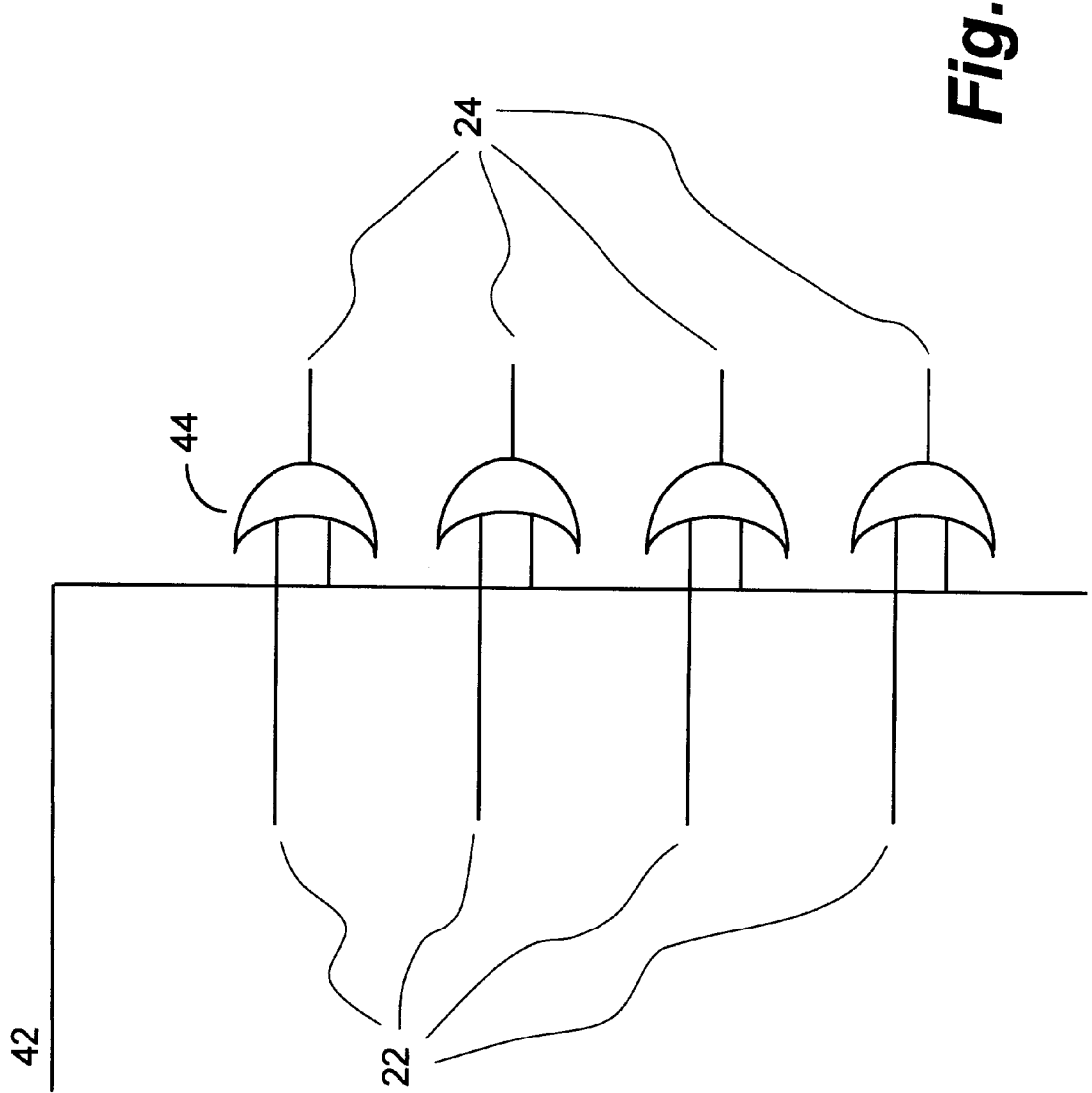
FIG. 2 demonstrates one embodiment of the connection between a switch circuit and a network interface in the disclosed switch system.

In a preferred embodiment, one of the M-side ports of the switch circuit 10 is designated as a special port, often referred to as embedded broadcast port or EB port. The function of the EB port shall be illustrated in the sequel when the operations of the switch system are described. Nevertheless, the EB port, as suggested by the name, is in communication with all the ports of the connectivity module. The difference between IS the EB port and the rest of ports in the M-side of the switch circuit is clearly defined, one being in communication with all the ports of the connectivity module and the other being in communication with only one of the ports of the connectivity module respectively. In FIG. 2, there is shown one embodiment of the communication between the EB port 42 and all the ports 22 of the network interface. It shall be comprehended in conjunction with FIG. 1. Ports indicated 22 are the M-side ports of the switch circuit 10, an array of OR gates indicated by 44 are employed to provide the communication between the switch circuit 10 and the ports 24 of the connectivity modules. If the EB port is activated or sending a packet out, the ports by 22 are inactivated and all the ports by 24 are then in communication with the EB port 42, thereby, the packet from the switch circuit 10 is broadcast to all the ports 22. If one of the ports indicated by 20 is activated or sending a packet, the EB port 42 becomes inactivated, therefore only the activated port is in communication with one of the ports 22 of the network interface, that is the receiving port presumably to be in communication with the activated port, thereby only the receiving device connecting to the receiving port is supposed to receive the packet therefrom.

Figure 3:
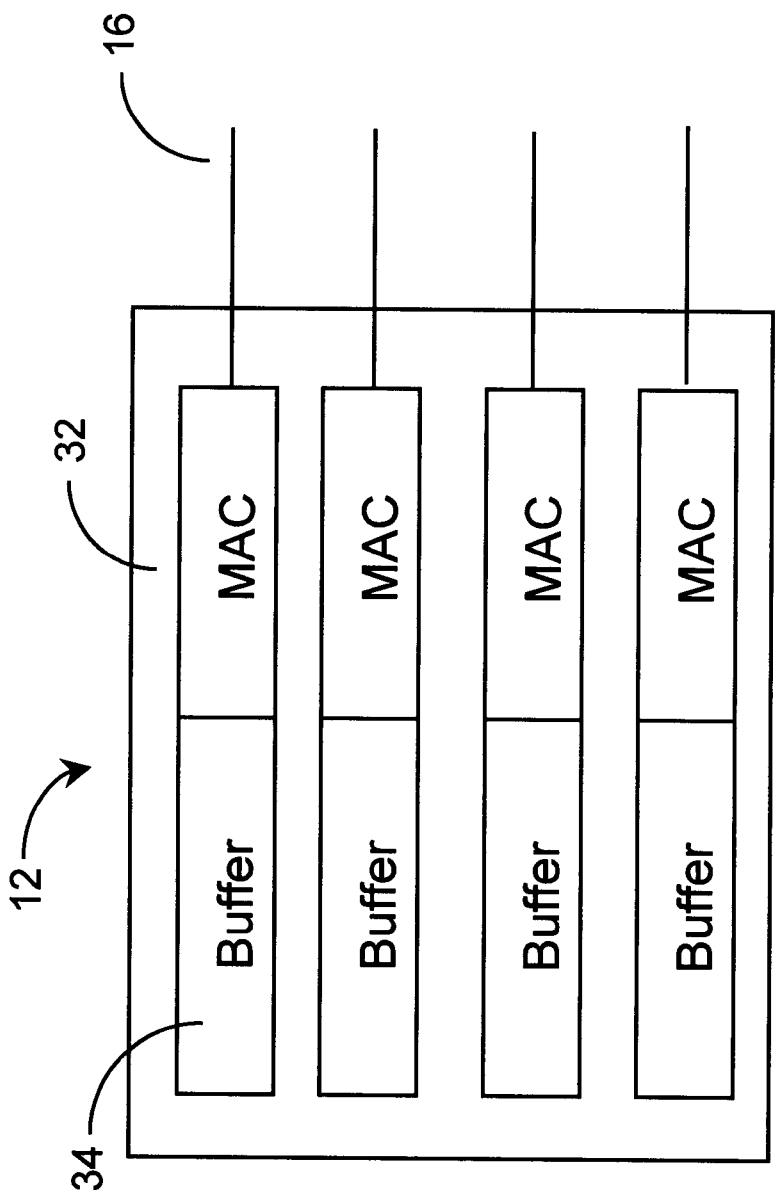
FIG. 3 illustrates an internal structure of the packet processing channels in the disclosed switch system.

To fully understand the operations of the switch system employing the N:M switch circuit, it is necessary to refer to FIG. 3 in which there is depicted an internal structure of the switch fabric 12. Each of the ports 16 in principle is a packet processing channel comprising a MAC 32 to process a packet passing through therein and a buffer 34 to temporarily store data in the packet. It is known to those skilled in the art that the MAC is a packet processing that normally stripes off the preamble of a packet and retrieves the DA information from the packet when the packet comes from the switch circuit and executes data transmission when data come from the buffer 34. the buffers in the switch fabric 12 store the data that are actually being exchanged among the devices and other related information that ensure the correct delivery of the data.

It is described in sufficient detail in the co-pending application that each of the connectivity modules 14a, 14b and 14c comprises an 8-bit register, each bit corresponding to one of the port ID's in the connectivity module. When a packet arrives at a port from a sending device connecting to the port, a carrier sense signal is generated and kept in the register as a bit signal. The bit signal corresponding to the port ID that received the packet is retrieved by a switch state circuit that further inquires the availability of a packet processing channel in the switch fabric. When one of the packet processing channels is available, namely the buffer has no data stored in or the MAC is not processing any packet, the switch circuit establishes an electronic link between the port on the N-side specified by the address of the available packet processing channel and the port on the M-side specified by the port ID retrieved by the switch state circuit. Therefore the arrived packet passes through the switch circuit to the available packet processing channel for further processing including the detection of the address information of the destination device to which the packet is destined.

Figure 4:
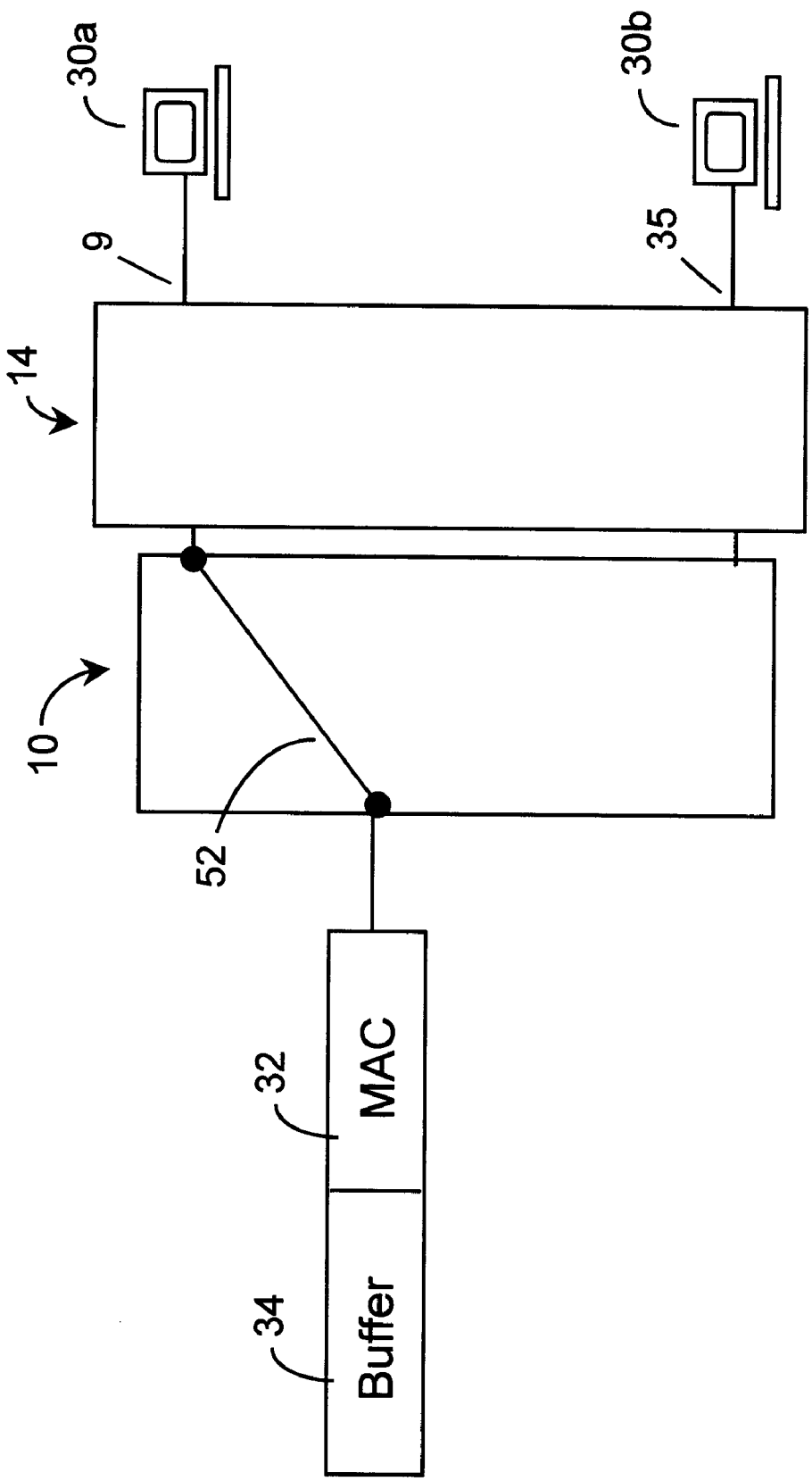
FIG. 4 depicts the operation of the disclosed switch system in a mode of receiving packet sent by a sending device.
Figure 5:
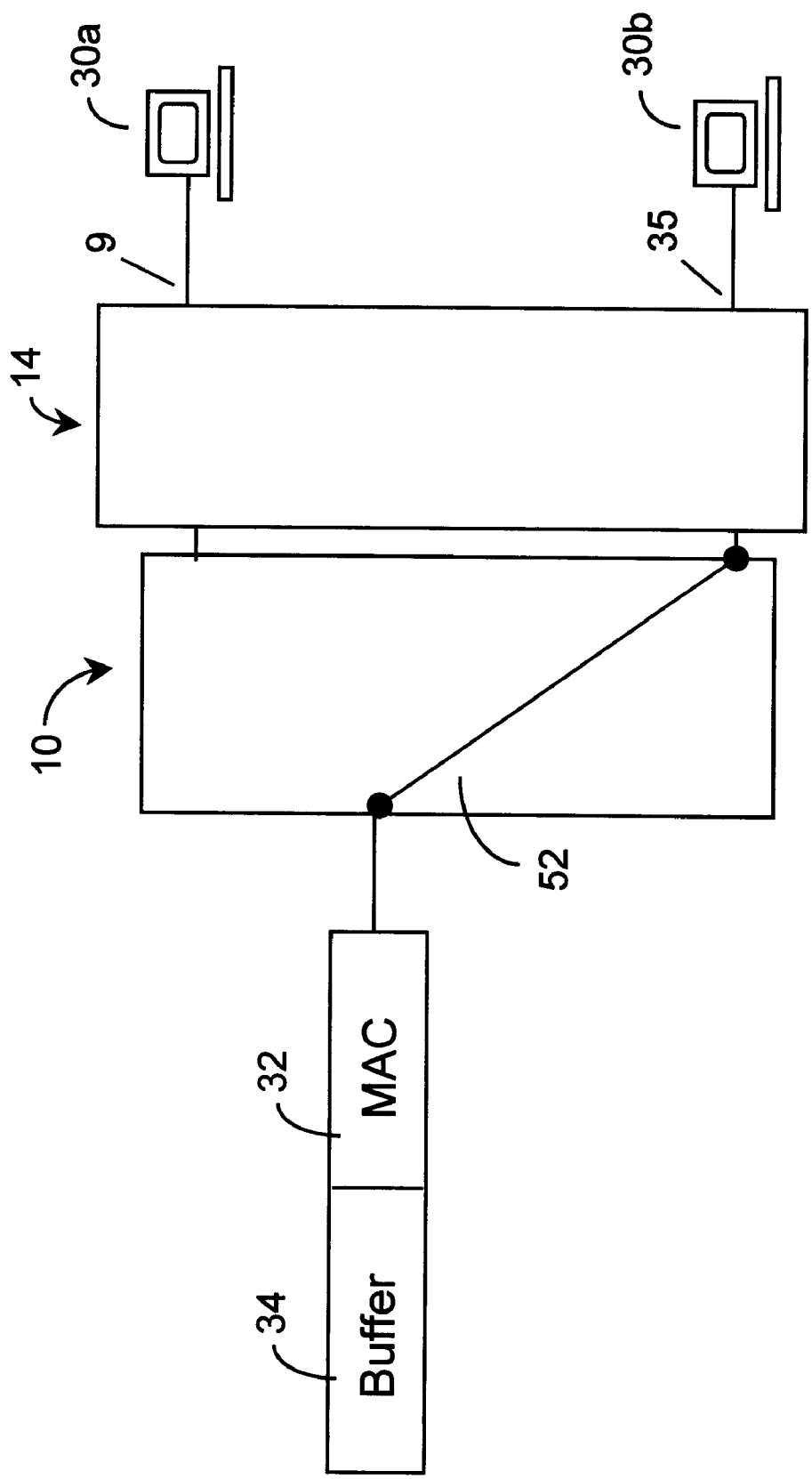
FIG. 5 depicts the operation of the disclosed switch system in a mode of delivering the packet to its destination.

Referring now to FIG. 4 and 5, each shows a detailed view of a packet being sent to the switch system and delivered to one packet processing channel, respectively. Device 30a, referred to as the sending device and device 30b, referred to as the receiving device are connected to the network interface 14, each having an port ID, for example #9 for Device 30a and #35 for Device 30b. Device 30a, is to send data to device 30b and a packet thereof is sent to the port 9 that device 30a is connected to. The packet comprises the data to be delivered to device 30b, DA information being an equivalence of #35 and SA information being an equivalence of #9. It is understood to those skilled in the art that each device is essentially a communication card, preferably Ethernet card. Each of the communication cards has a unique serial identification number registered with IEEE 802 Committee, a standardization organization. The SA information in the packet therefore contains, in fact, the device MAC address of Device 30a is understood by the switch system and can be mapped to the equivalence of the port ID #9. Upon the arrival of the packet at the connectivity module 14, a carrier sense signal is generated and stored in the register as the bit signal which essentially indicates the port ID #9 has received the packet. When there is an available packet processing channel comprising a buffer 34 and a MAC 32 in the switch fabric, the address thereof is supplied to the switch circuit 10 along with the bit signal in the register, accordingly the switch circuit establishes an electronic link between the packet processing channel and the port specified by the port ID of the network interface 14 such that the packet passes through the link 52 to the packet processing channel. Upon receiving the packet, the MAC 32 extracts the SA and DA information from the packet and passes the data to the buffer 34. With the control of the central processor (not shown in the figure), the extracted port ID from the DA information is then sent to the network interface 14 to see if the port is available. If the port is available, the MAC 32 calls upon the switch circuit 10 with the port ID from the DA information to establish a new link 54 between the same packet processing channel and the specified port as indicated in FIG. 5, hence the packet passes through the MAC 32 and the link 54 to the destination port 35 so as to complete the data transmission.

The present invention has been described in sufficient detail with one exemplary embodiment. Alternative embodiments will become apparent to those skilled in the art to which the present invention pertains without departing from its spirit and scope. For example, a switch circuit may be implemented in the network interface and provide direct linkages between two ports that are in exchange of data. This alternative embodiment essentially merges the switch fabrics and the N:M switch circuit into the network interface. Another possible embodiment is the use of a plurality of repeaters in place of the switch circuit, each repeater is in communication with one packet processing channel and at least two pairs of ports of the network interface. The repeaters can be controlled through the central processor to redirect a packet arrived in a packet processing channel from a sending device without the need of going through another packet processing channel provided that the receiving device is in communication with the repeater. Accordingly, the scope of the present invention is defined by the appended claims rather than the forgoing description of one embodiment.

What is claimed is:

1. A switch system for data communication comprising at least two devices, one being sending device and the other being receiving device, the sending device sending a packet to the receiving device through the switch system, the packet comprising data, DA and SA information, the switch system comprising:

a switch fabric having a plurality of packet processing channels, each comprising one buffer and one MAC;

a switch circuit having a plurality of first ports and at least two second ports, each of the first ports being connected to the packet processing channels, respectively, each of the first ports having a first address and each of the second ports having a second address, the switch circuit, upon receiving the equal number of the first and the second addresses, performing detachable electronic links, respectively, between the first ports and the second ports, each being addressed by the received first and second addresses, respectively;

a network interface having at least first interface ports and second interface ports, each of the first interface ports being connected to each of the second ports of the switch circuit, thereby each of the first interface ports has an identification with respect to one of the second addresses of the switch circuit, each of the second interface ports being assigned to a port ID, thereby one of the second interface ports being assigned to a sending port ID to which the sending device is coupled and another one of the second interface ports being assigned to a receiving port ID to which the receiving device is coupled; and both of the sending port ID and the receiving port ID being embedded in the SA and DA information, respectively, in the packet.

2. A scalable switch system as recited in claim 1 wherein the switch circuit receives one of the second address and the sending port ID when there is one of the packet processing channels is available.

3. A scalable switch system as recited in claim 2 wherein the switch circuit establishes an electronic link between the available packet processing channel specified by the received second address and one of the first interface ports of the network interface specified by the sending port ID to allow the packet to pass through to the packet processing channel.

4. A scalable switch system as recited in claim 3 wherein the switch circuit disengages the electronic link upon the completion of the packet passing through therein.

5. A scalable switch system as recited in claim 4 wherein the packet processing channel in the switch fabric further processes the received packet, the data part of the packet being stored in the buffer thereof and the DA information being translated to the receiving port ID the receiving device is coupled to.

6. A scalable switch system as recited in claim 5 wherein the switch system establishes a new electronic link between the packet processing channel and the port of the second interface ports of the network interface specified by the receiving port ID thereby the packet comprising the data stored in the buffer passing through the switch circuit via the MAC and to the port of the network interface for the receiving device to receive the data.

7. A scalable switch system as recited in claim 6 wherein the switch circuit disengages the new link upon the completion of the packet passing through therein.

8. A scalable switch system as recited in claim 1 wherein one of the second ports of the switch circuit is an EB port in communication to all of the first interface ports of the network interface when the rest of the second ports of the switch circuit become inactivated, the EB port becoming inactivated when one of the rest of the second ports of the switch circuit becomes activated and hence in communication with one of the first ports of the switch circuit.

9. A scalable switch system as recited in claim 8 wherein the switch circuit receives one of the second addresses and the sending port ID when there is one of the packet processing channel is available.

10. A scalable switch system as recited in claim 9 wherein the switch circuit establishes the electronic link between the available packet processing channel specified by the received second address and one of the first ports of the switch circuit specified by the sending port ID to allow the packet to pass through to the packet processing channel.

11. A scalable switch system as recited in claim 10 wherein the switch circuit disengages the electronic link upon the completion of the packet passing through is therein.

12. A scalable switch system as recited in claim 11 wherein the packet processing channel in the switch fabric further processes the received packet, data part of the packet being stored in the buffer thereof and the DA information being translated to the receiving port ID the receiving device is connected to.

13. A scalable switch system as recited in claim 12 wherein the switch system establishes a new electronic link between the packet processing channel and the EB port thereby the packet comprising the data stored in the buffer passing through the switch circuit to each of ports of the network interface and all the devices in the data network receiving the packet.

* * * * *